United States Patent [19]

Hirohata

[11] Patent Number: 4,508,442
[45] Date of Patent: Apr. 2, 1985

[54] ELECTROMAGNETICALLY DRIVEN SHUTTER CAMERA HAVING AUTOMATIC FOCUSING DEVICE

[75] Inventor: Michio Hirohata, Tokyo, Japan

[73] Assignee: Canon Kabushiki Kaisha, Tokyo, Japan

[21] Appl. No.: 413,464

[22] Filed: Aug. 31, 1982

[30] Foreign Application Priority Data

Sep. 8, 1981 [JP] Japan ................................. 56-141534
Sep. 9, 1981 [JP] Japan ................................. 56-142816

[51] Int. Cl.³ ........................... G03B 3/10; G03B 9/14
[52] U.S. Cl. ................................... 354/400; 354/435; 354/234.1
[58] Field of Search ................ 354/25 R, 25 A, 25 P, 354/25 N, 60 A, 195, 230, 435, 400–409, 448, 442, 234.1, 195.1; 355/56; 352/140; 310/80; 335/219, 221, 222, 228

[56] References Cited

U.S. PATENT DOCUMENTS

| | | | |
|---|---|---|---|
| 3,618,499 | 11/1971 | Harvey | 354/25 A X |
| 3,709,137 | 1/1973 | Starp | 354/448 |
| 3,720,148 | 3/1973 | Harvey | 354/25 A |
| 3,869,930 | 3/1975 | Forest | 335/222 X |
| 4,058,819 | 11/1977 | Rieder | 354/60 A |
| 4,117,500 | 9/1978 | Kondo | 354/442 |
| 4,199,235 | 4/1980 | Matsuda et al. | 354/25 N |
| 4,390,260 | 6/1983 | Prinz | 354/195 X |

Primary Examiner—William B. Perkey
Attorney, Agent, or Firm—Toren, McGeady and Stanger

[57] ABSTRACT

Pulses through a coil in a magnetic field move the coil back and forth and cause an engagement arrangement to execute successive roundtrip movements that advance a focus control along one step for each pulse. According to an embodiment of the invention, the inertia of an exposure control is too great to follow the back and forth motion of the coil in response to these focusing pulses. However, longer exposure control pulses allow the exposure control to follow the coil motion.

12 Claims, 2 Drawing Figures

ELECTROMAGNETICALLY DRIVEN SHUTTER CAMERA HAVING AUTOMATIC FOCUSING DEVICE

BACKGROUND OF THE INVENTION

1. Field of the Invention:

This invention relates to cameras with automatic focusing devices whose operations are controlled by the electromagnetic force exerted on an electromagnetically driven shutter.

2. Description of the Prior Art:

U.S. Pat. No. 4,243,309 and U.K. Pat. No. 2,016,155A disclose cameras in which a single electromagnet provides the force for performing automatic focusing operation (hereinafter "AF" operation) and a shutter blade opening and closing operation. However, such conventional cameras use a control member to start a motion and stop the motion at the focused position when the electromagnet is energized and de-energized during the AF operation. This requires accurately sensing the position of the control member during motion. Also, such conventional camera need to arrest the moving control member accurately in the focused position. This requires adjusting each mechanism by taking into account the lag of the actuation, or the lag from the moment the focus detecting means produces an actuating signal to the moment the control member is stopped by the electromagnet.

Therefore, prior art cameras were disadvantageous because of the need for the fine adjustment in each of the coordinated mechanisms. This is particularly true regarding the relationship with the shutter mechanism.

SUMMARY OF THE INVENTION

An object of the present invention to provide a camera in which an AF operation control member is advanced step-by-step as the coil of an electromagnetically driven shutter moves back and forth, so that the AF operation and the shutter operation can be controlled with high accuracy while still preserving a very simple structure without the need for elaborate adjustments.

These and other objects of the present invention will become apparent from the following description when read in light of the accompanying drawings.

DETAILED DESCRIPTION OF THE PREFERRED EMBODIMENTS

The present invention will next be described in greater detail by reference to the drawings.

Figure 1:
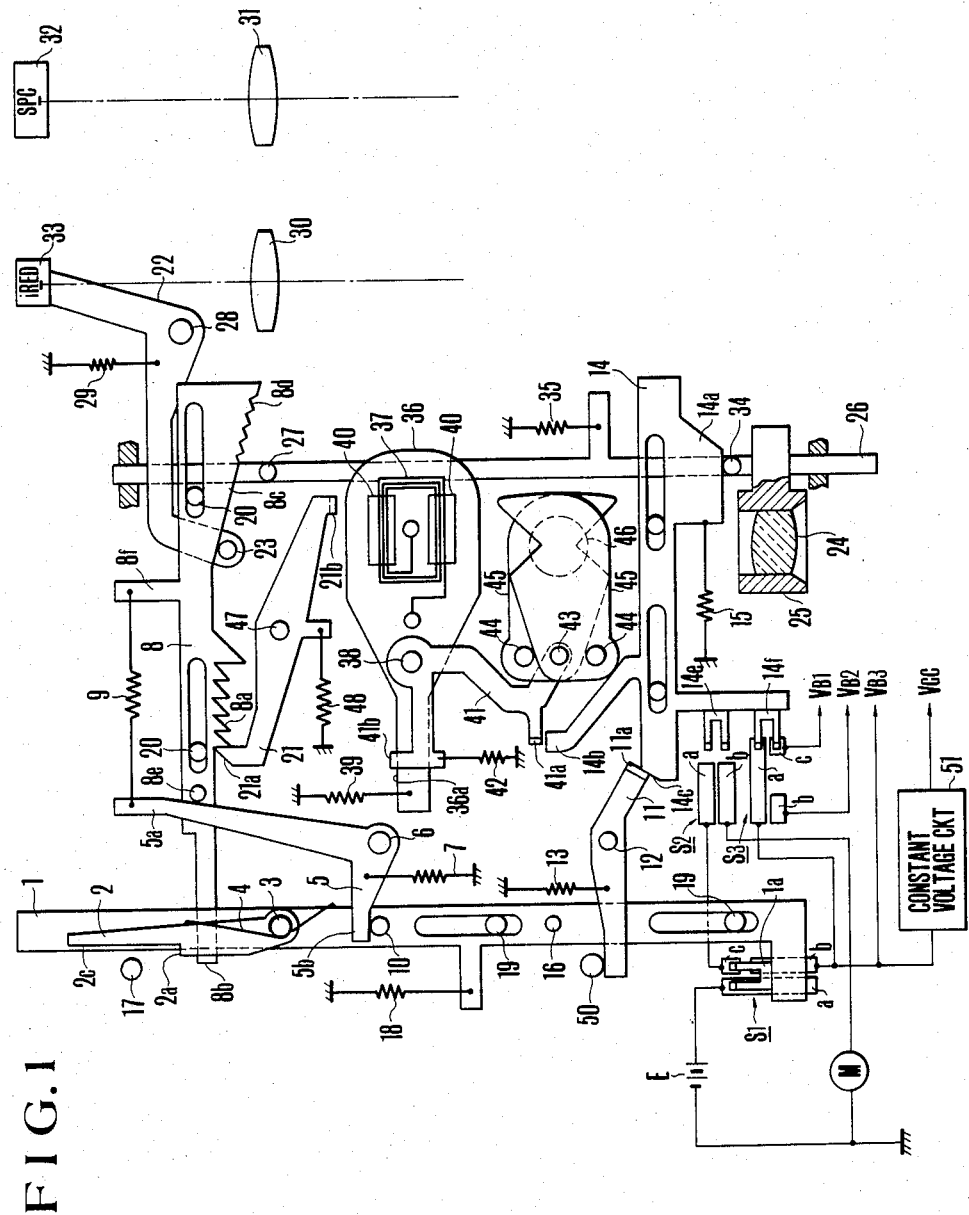
FIG. 1 is a schematic elevational view of an embodiment of an electromagnetically driven shutter camera having an automatic focusing device according to the present invention.

In FIG. 1 a release member 1 is supported by two stationary pins 19 slidingly movable in vertical directions as viewed in the drawing and arranged to cooperate with a release button (not shown) on the camera housing (not shown). A lock lever 2 is pivotally mounted on a pin 3 fixed to the release member 1 and urged by a spring 4 to turn counterclockwise so that its side edge 2 abuts a pin 17. A set lever 5 has an arm 5a connected to a drive spring 9 for an AF control slide 8. Another arm 5b which abuts a pin 10 fixed to the release member 1, is rotatable about a pivot pin 6 and urged counterclockwise by a spring 7.

When the release member 1 moves down with its pin 10, the set lever 5 follows the pin 10 in response to the action of the bias spring 7. This charges the spring 9. A barrel start level 11 pivotal about a pin 12 is urged clockwise by a spring 13. In the extreme position, one arm 11a of the barrel start lever 11 can latch a barrel motion control slide 14 against the force of a spring 15 which urges the slide 14 to the left. The clockwise movement of the start lever 11 is limited by a pin 50. Fixed to the release member 1 is a barrel start actuator pin 16 located so that, as the shutter button is fully depressed and the release member 1 moves from its first position to the second position, the barrel start lever 11 is turned counterclockwise to disengage its pawl 11a from the left end 14c of the barrel motion control slide 14.

A switch S1 has its conducting position changed by a control 1a on the release member 1. When the release member 1 is in the illustrated or set position (where the shutter button is not depressed), a patch, a, connected to the position terminal of a battery E is electrically connected to a patch, c, so as to allow for current flow from the battery E to an electric motor M. When the release member 1 is moved downwards as viewed in the drawing, the path, a, and a patch, b, are electrically connected to each other so as to allow for current flow to a control circuit to be described later.

It is to be noted that in this embodiment, the term "first position" of the release member 1 used herein results from movement terminating at the contact of the actuator pin 16 on the barrel start level 11, and the term "second position" results from subsequent movement terminating at a release of the barrel motion control slide 14 from latching connection with the barrel start level 11 by the actuator pin 16. It is to be also noted that in this embodiment, the bias force of the spring 13 which urges the barrel start lever 11 is stronger than the bias force of a spring 18 which urges the release member 1 upwards as viewed in the drawing so that the photographer is readily aware of a point in time at which the release member 1 transmits from the first position to the second position. That is, the photographer feels a heavier reaction on the release button on the way to the second position than on the way to the first position.

An AF control slide 8 is movable horizontally as viewed in the drawing as is guided by guide pins 20, its movement being stopped by a pawl 21a of an arresting lever 21 engaging one of teeth 8a. An interlocking pin 8e is mounted on the AF control slide 8 at such a location that when the release member 1 is pushed down, the set lever 5 moves away from the interlocking pin 8e to allow for leftward movement of the AF control slide 8. As the AF control slide 8 was in a leftwardly advanced position from the illustrated position, when the release member 1 returns to the initial or illustrated position, the set lever 5 is turned clockwise while moving the AF control slide 8 backward to the illustrated position. The AF control slide 8 as a prohibiting pawl 8b. This latter is arranged so that when the depression of the release member 1 to a prescribed position (or first position) does not lead to actuating the arresting lever 21, for example, because the battery E has run out for, the AF control slide 8 remains in the illustrated position. Returning of the release member 1 is thus hindered by the prohibiting pawl 8b engaging the lock lever pawl 2a.

The AF control slide 8 has a cam portion 8c cooperating with a cam follower 23 on one arm end of a distance measuring lever 22 another arm end of which fixedly carries a light projection element (IRED) 33 for distance measurement. Also formed beyond, but contiguous to, the cam portion 8c is a stepped abutment portion 8d cooperating with a post 27 mounted on a slidable shaft 26 which is fixedly secured to a barrel 25 containing a photographic objective 24, to find the object distance. Also, 8f is an extension to which is connected the spring 9. The distance measuring lever 22 pivots about the pin 28 and is urged by a weak spring 29 in a clockwise direction. Light emitted from the element 33 is collimated by a projection lens 30, and the reflected light from an object to be photographed is collected by a lens 31, incident upon a photo-sensitive element (SPC) 32 by which it is coverted to an electrical signal.

The barrel slide 14 when moved to the left, as shown, causes a contact 14e to render a switch SW2 electrically conductive, and another contact 14f to change the conducting state of a switch S3. Also, terminals, a, and, b, of the switch S2 are respectively connected to the terminal, c, of the switch S1 and one end of the winding of the motor M, and a terminal, a, of the switch S3 is connected to the terminal, b, of the switch S1.

It is noted that the switch S1 with the terminals, a and b when rendered electrically conductive causes a constant voltage circuit 51 to apply a constant voltage Vcc to all exposure control circuits to be described later, and renders it possible to supply a voltage $V_{B3}$ to a coil 37. Leftward movement of the barrel slide 4 as viewed in the drawing results in movement of the follower 34 on the slide shaft 26 in engagement on the camming surface 14a along the barrel 25 due to the action of the spring 35, and renders the switch S2 electrically conductive between the terminals, a and b, after a slight delay from that timing, so that after that, when the release member 1 moves backwards, current supply to the motor M is allowed to start.

Figure 2:
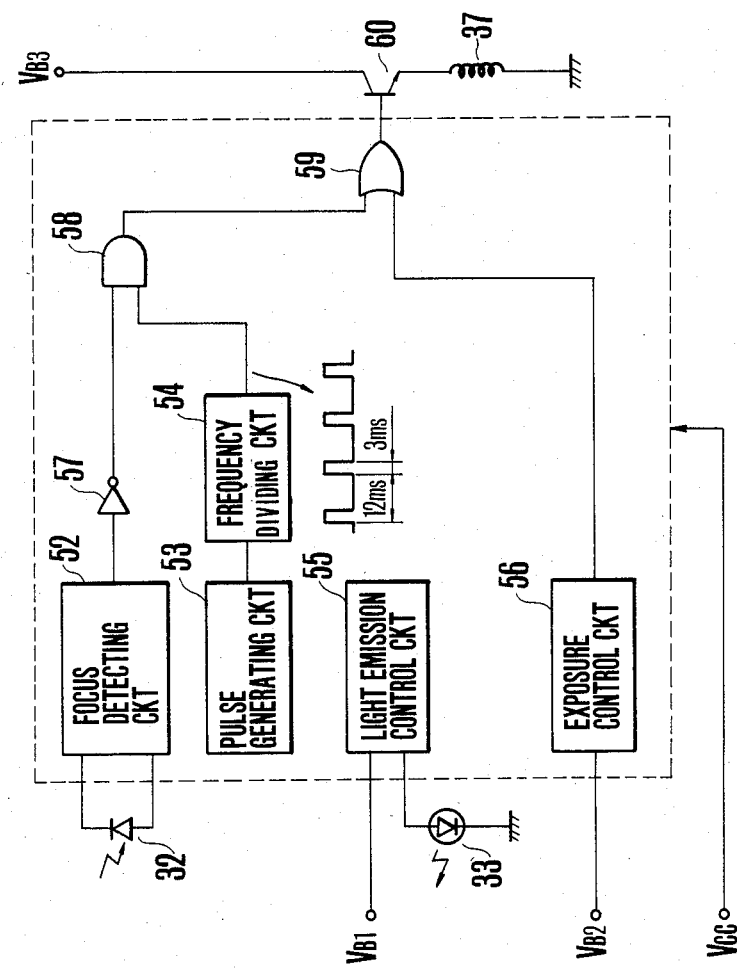
FIG. 2 is an electrical circuit diagram, partly in block form, of a control circuit for the camera of FIG. 1.

The switch S3, which responds to simultaneous conduction between the terminals a and b of the switch S1 and the conduction between its terminals a and c applies a voltage $V_{B1}$ to a light emission control circuit 55 of FIG. 2. In response to conduction between its terminal a and b, switch SW3 applies a voltage $V_{B2}$ to an exposure control circuit 56 of FIG. 2.

The barrel motion control slide 14 is provided with a charge portion not shown in the drawing arranged so that when film (not shown) is advanced, the cam 14a moves slidable shaft 26 while simultaneously energizing the spring 15. Just before the termination of the charging operation, the switch S2 is turned from ON to OFF. The aforementioned charging of the film winding means and the barrel motion control slide 14 is accomplished by utilizing the inertia of the motor M and other associated parts.

A rotor 36 for shutter and AF drives has a printed coil 37 arranged on either side of a substrate of glass epoxy material and pivots about a shaft 38. The rotor 36 receives a clockwise rotative force by a spring 39. When current flows through the coil 37, a Lorentz force produced between the rotor 36 and magnets 40 rotates the rotor 39 counterclockwise while charging the spring 39. A sector lever 41 rotatable about the common shaft 38 of the rotor 36 includes a bent-off portion 41b engaging a slide edge 36a of the rotor 36. The lever 41 with its portion 41b follows the counterclockwise motion of the rotor 36 in response to the action of the spring 42, and the clockwise return movement of the rotor 36 in response to the action of the spring 39. Mounted on the sector lever 41 is a section pin 43 through which the sector lever 41 turns shutter blades 45 which also serve as diaphragm blades, about sector shafts 44, so an exposure aperture 46 is partly or wholly opened when an exposure is being made.

The arresting lever 21 is rotatable about a shaft 47 and is urged clockwise by a weak spring 48.

When the print coil 37 is supplied with a current pulse of short duration, the rotor 36 turns counterclockwise and strikes the arresting lever 21 at the bent-off portion 21b. Then the arresting lever 21 executes a back-and-forth rotary motion, i.e., makes a round trip. Thereby the pawl 21a of the arresting lever 21 catches the next tram tooth 8a. Thus, the slide 8 advances one step for every one pulse of current supply. This current supply is so short and therefore the rotor 36 moves so rapidly that the second lever 41 cannot follow up because of the inertia of the shutter blades 45. Therefore the shutter blades 45 do not open. The sector lever 41 has a detent portion 41a arranged to engage a position detecting portion 14b of the barrel slide 14 when the barrel slide 14 is in the illustrated position, so that the shutter blades 45 are hindered from opening even mechanically.

After the release member 1 reaches its second step or position and the barrel start lever 11 has moved, and the slidable shaft 26 has moved upwards as viewed in the drawing to set the photographic objective 24 in the in-focus position, the pin 27 engages the stepped abutment 8d of the AF control slide 8 to hinder leftward movement of the AF control slide 8 as viewed in the drawing. Therefore, in this state despite the fact that the moving coil 37 is supplied with an exposure control current to turn the arresting lever 21, the Af control slide 8 remains stationary. At this time, the first position detecting portion 14b is moved out of the path of movement of the detent portion 41a. For this current supply lasts relatively long, and following the rotation of the rotor 36, the second lever 41 rotates to open the shutter blades 45, thus initiating an exposure.

The operation of the device is explained with respect to various moves by reference to the circuit of FIG. 2.

(1) Pre-focus Mode:

When the shutter release button 1 is pushed lightly down, the set lever 5 turns counterclockwise, allowing the AF control slide 8 to be moved. After that, a distance measuring switch (not shown) respond to the release member reaching its first position turns on the patches, a and b, of the switch S1 electricaly communicate with each other. This supplies the light emission control circuit 55 with the voltage $V_{B1}$ through the patches a and c of the switch S3, and the light projection element starts to emit light. Also, the constant voltage circuit 51 receives current from the battery E through the switch S1 in its "b" position, and the entire control circuit is thus supplied with the constant voltage Vcc. In response, a pulse forming circuit 53 produces a train of pulses at a given frequency. The pulses are then applied to a frequency dividing circuit 54. The frequency dividing circuit 54 divides said frequency so that electrical signals in the form of pulses each having a width of, for example, 3 milliseconds and occurring every 12 msec. appear at its output terminal.

At this time, because a focus detecting circuit 52 does not yet detect a peak of the light reflected from the object, its output low, and, therefore, an inverter circuit 57 produces an output of high level which is applied to one of two inputs of an AND gate 58. This permits the pulsed electrical signal from the frequency divider circuit 54 to pass through the AND gate 58 and further therefrom through an OR gate 59 to render a switching transistor 60 intermittently conductive. This continues until the focus detecting circuit 52 changes its output to high when the peak of the reflected light from the object is detected.

On the other hand, when the switching transistor 60 conducts, the voltage $V_{B1}$ causes a current flow through the coil 37. This drives the rotor 36 intermittently in the counterclockwise direction against the force of the return spring 39. As a result, the rotor 36 moves pendularly. Thus, the anchor lever 21 repeats its cyclic movements, for every one of which the AF control slide 8 moves the length of one tooth of the tram rack 8a. At this time, the distance measuring lever 22 causes the light projecting element 33 to scan the target area.

As the scanning of the light projecting element 33 goes on, when the focus detecting circuit 52 detects a peak of intensity of the reflected light (or an in-focus condition relative to the given object), the inverter circuit 57 changes its output to low as stated above, so the AND gate 58 is gated off. Because the pulse signal from the frequency divider 54 no longer arrives at the switching transistor 60, the current supply to the coil 37 is stopped. This stops further pendular movement of the rotor 36. The stepped abutment 8d new takes a position commensurate to the in-focus position of the photographic lens 24.

Here, the release member 1 is left to return by the action of the spring 18. Such movement is transmitted by the pin 10 to turn the set lever clockwise, which in turn causes the AF control slide to move rightwards as viewed in the drawing to the initial or set position. It is therefore to be understood that slight depression of the release member 1 to the first position or step results in pre-focusing and the return of the release member 1 results in resetting the device from the pre-focusing operation.

(2) Lens setting Mode

The lens setting mode occurs after the AF control slide 8 has moved to the predetermined position in relation to the object distance, and when the release member 1 is pushed down further. Then, the actuator pin 16 strikes the tail of the barrel start lever 11 which is then turned counterclockwise to disengage the lug 11a of the lever 11 from the recess 14c of the barrel slide 14. As the barrel slide 14 then move to the left as viewed in the drawing, the camming surface 14a retreats and permits the slidable shaft 26 to move upwards with the photographic objective lens 24 as viewed in the drawing until the detent pin 27 engages the one of the steps of the abutment 8d which was aligned thereto in the pre-focusing mode. The movement of the barrel slide 14 also causes the switch S2 to turn on and the switch S3 to allow the voltage $V_{B2}$ from its terminal b to energize the exposure control circuit 56. It is to be also noted that at this time the current supply to the light emission control circuit 55 is cut off, thus terminating the energization of the light projecting element 33.

The start of the current supply by the voltage $V_{B2}$ to the exposure control circuit 56 causes the output of the circuit 56 to change to a high level which is then applied through the OR gate 59 to turn on the switching transistor 60. This starts a current through the coil 37. The adjustment of the photographic lens 24 to the in-focus presetting position has now been completed.

(3) Exposure control Mode

When the switch S3 is changed over from the AF control mode (its "c" position) to the exposure control mode (its "b" position), the moving coil 37 is supplied with current continuously. Since the current supply in the exposure control mode lasts relatively long until the exposure control circuit 56 integrates light coming from the object to a prescribed level, it follows that the sector lever 41 can catch up with the rotating rotor 36 and drive the shutter blades 45 so they open, thus initiating an exposure. Upon termination of a time interval depending upon the light value, the output of the exposure control circuit 56 changes to low and cuts off the current supply to the moving coil 37. Then, the force of the spring 39 turns the rotor 36 clockwise, which then turns the sector lever 41 also. Thus, the shutter blades 45 close the exposure aperture.

At this time, although the rotor 36 also turns the anchor lever 21, the AF control slide 8 is prevented from moving leftwards as viewed in the drawing by the detent pin 27 engaging the abutment 8d. It follows that the shutter operation never breaks the once-established setting of the lens on the in-focus position.

(4) Resetting Mode

When the exposure has been completed, and the photographer removes his finger from the shutter release button (not shown), the release member 1 returns in response to the action of the spring 18, and the switch S1 is moved to its "a-and-b" position where the motor M is energized with the current supply from the battery E to start winding a film. When the film is being wound up, a charging mechanism (not shown) charges the barrel slide 14. In response to this charging of the barrel slide 14, the switch S2 turns off just before the film advances the length of one frame. Though the current supply to the motor M stops at this time, the inertia of the motor M and parts associated therewith instead brings the camera into the completely set state.

(5) Protecting mode with battery when run out

The camera of the invention employs a mechanical arrangement for releasing the barrel slide 14 from the locking connection. Hence, it would be assumed that, despite the fact that the shutter did not operate because of failure of current to the coil 37 or the like, when the shutter release button returned, the subsequent or film winding operation would take place. On this account, in the device of the invention, a provision is made at the lock lever 2 such that if the AF control slide 8 was not actuated, when the release member 1 is to return, it engages the prohibiting pawl 8b, thereby interrupting the returning movement of the release member 1. That is, when the moving coil 37 was not fully energized (because of broken wires or battery voltage fall), and the latching lever 21 did not move, the AF control slide 8 is left unchanged from the set position. Thus, the release member 1 is prevented from returning and therefore the current does not reach the motor M.

As has been described in greater detail in connection with the above, the invention uses an electricity to mechanical torque converter arrangement whose operation can be controlled by an electrical signal. The arrangement in the form of an electromagnetic device having a moving coil arranged to drive both of an automatic focus control and a shutter control selectively. In the AF mode, the moving coil is supplied with current in the form of short pulses so that position of the AF setting mechanism can be adjusted in discrete values. This results in advantages, namely, that the AF control and setting mechanisms are amenable to easy assembly techniques and that the auto-focus-equipped electromagnetic shutter camera can be constructed in a simple form and manufactured by low unit cost techniques. Further, the present invention is uses the first step of the shutter button travel only to actuate the AF control for distance presetting, thereby making it possible to perform a pre-focusing operation. In addition thereto, since the pre-focusing mechanism can be reset by a weak force, revising the pre-focusing requires the photographer only to remove his finger from the shutter button.

Another feature of the invention involves the time when the shutter release button transmits from the first to the second position. The camera is then switched from a condition in which the AF is operative and the shutter is inoperative to another condition in which the AF is inoperative and the shutter is operative. Also, the AF and the shutter are alternately locked by making the best use of the merits of the drive device of the type which works with the moving coil. This offers an additional advantage in that an AF and shutter control of simple structure operating with high accuracy and reliability can be obtained at a low production cost.

What I claim:

1. Camera including:
   (a) a coil arranged in a magnetic field, said coil responsive to a current supply moving from an initial position and responsive to a termination of the current supply returning to the initial position;
   (b) latching means arranged to make a round trip when said coil moves and returns;
   (c) control means for controlling a focus adjusting operation, said control means upon movement in a predetermined direction performing the focus adjusting operation and upon engagement with said latching means being hindered from movement, and said control means having a plurality of teeth each engageable with said latching means;
   (d) signal generating means for producing a pulse-shaped electrical signal so as to repeat cyclic current supplies to said coil, said signal generating means controlling the current supply to said coil in such a manner that one pulse of the electrical signal allows for said latching means to engage the next tooth of said control means;
   (e) blade members for performing an exposure operation; and
   (f) transmitting means for transmitting the round trip of said coil to said blade members to open and to close said blade members, said transmitting means being displaceable independently of said coil when said coil moves forwards, and displacing as a unit with said coil when said coil returns.

2. Camera including:
   (a) a coil arranged in a magnetic field and responsive to a current supply for moving from an initial position and responsive to a termination of the current supply for returning to the initial position;
   (b) engaging means arranged for round trip travel when said coil moves and returns;
   (c) control means for controlling a focus adjusting operation, said control means being arranged for advancing in a predetermined direction upon a round trip movement of said engaging means to perform a focus adjusting operation, said control means having a plurality of parts engageable with said engaging means;
   (d) signal generating means for producing a pulse-shaped electrical signal so as to repeat cyclic current supply to said coil, said signal generating means controlling the current supply to said coil such that one pulse of the electrical signal allows for said engaging means to engage a next part of said control means;
   (e) blade members for performing an exposure operation; and
   (f) transmitting means for transmitting the round trip of said coil to said blade members to open and to close said blade members, said transmitting means being displaceable independently of said coil when said coil moves forwards, and displacing as a unit with said coil when said coil returns.

3. A camera including:
   (a) engaging means;
   (b) electromagnetic means responsive to a current supply for moving said engaging means from an initial position, and responsive to termination of the current supply for returning said engaging means to the initial position;
   (c) control means for controlling a focus adjusting operation, said control means upon movement in a predetermined direction being arranged for performing a focus adjusting operation and upon engagement with said engaging means being to have movement of the control means controlled by said engaging means, and said control means having a plurality of parts engageable with said engaging means;
   (d) signal generating means for producing a pulse-shaped electrical signal so as to repeat cyclic current supplies to said electromagnetic means, said signal generating means being arranged for controlling the current supply to said electromagnetic means in such a manner that one pulse of the electrical signal allows said engaging means to engage a next part of said control means;
   (e) blade members for performing an exposure operation; and
   (f) transmitting means for transmitting the round trip of said electromagnetic means to said blade members to open and close said blade members, said transmitting means being displaceable independently of said electromagnetic means when said electromagnetic means moves forwards, and displacing as a unit with said electromagnetic means when said electromagnetic means returns.

4. A camera according to claim 1, 2, or 3 further including:
   (g) prohibiting means for prohibiting actuation of said transmitting means.

5. A camera according to claim 4, further including:
   (h) release means arranged to move in response to a shutter button on the camera, said release means upon movement from a first position to a second position causing start of a pulse-like current supply to said coil, and upon further movement from the 2nd position releasing said transmitting means from locking connection with said prohibiting means.

6. A camera according to claim 5, further including:
   (i) a photographic lens; and (j) lens moving means for moving said photographic lens to an in-focus position determined by said control means, said lens moving means being rendered operative when said prohibiting means takes action to release said transmitting means from locking connection therewith.

7. A camera according to claim 6, wherein said control means is hindered from movement by a member cooperative with said photographic lens when said photographic lens is set in the in-focus position.

8. A camera according to claim 6, wherein said control means is returned to the initial position by said release means moving back from the second to the first position, when said photographic lens is in the initial position.

9. A camera including:
(a) latching means;
(b) electromagnetic means responsive to a current supply for moving said latching means from an initial position, and responsive to termination of the current supply for returning said latching means to the initial position;
(c) control means for controlling a focus adjusting operation, said control means upon movement in a predetermined direction performing the focus adjusting operation and upon engagement with said latching means being hindered from movement, and said control means having a plurality of teeth each engageable with said latching means;
(d) signal generating means for producing a pulse-shaped electrical signal so as to repeat cyclic supplies to said electromagnetic means, said signal generating means controlling the current supply to said electromagnetic means in such a manner that one pulse of the electrical signal allows for said latching means to engage the next tooth of said control means;
(e) blade members for performing an exposure operation; and
(f) transmitting means for transmitting the round trip of said electromagnetic means to said blade members to open and close said blade members, said transmitting means being displaceable independently of said electromagnetic means when said electromagnetic means moves forwards, and displacing as a unit with said electromagnetic means when said electromagnetic means returns.

10. An electromagnetic driving device comprising:
(a) electromagnetic means;
(b) a drive member displaceable by the electromagnetic force of said electromagnetic means;
(c) engaging means for performing a repeated operation in association with the displacement of said drive member;
(d) focus adjusting means for moving the aforesaid photographic lens to an in-focus position, said focus adjusting means being arranged to engage said engaging means and upon engagement with said engaging means to advance stepwise in a prescribed direction as said engaging means performs its repeated operation so the amount of movement of the aforesaid photographic lens is determined by the number of steps said focus adjusting means has taken;
(e) first signal generating means for actuating said electromagnetic means for a period necessary for said focus adjusting means to advance stepwise until said photographic lens reaches the in-focus position;
(f) shutter means for performing an exposure operation, said shutter means being operated in response to displacement of said drive member displaces;
(g) second signal generating means for actuating said electromagnetic means for a period necessary to complete the exposure operation; and
(h) changeover means responsive to attainment of the aforesaid photographic lens of the in-focus position for rendering said first signal generating means inoperative and initiating an operation of said second signal forming means.

11. A camera including:
(a) a coil arranged in a magnetic field and responsive to a current supply for moving from an initial position and responsive to a termination of the current supply for returning to the initial position;
(b) engaging means arranged for round trip travel when said coil moves and returns;
(c) control means for controlling a focus adjusting operation, said control means being arranged for advancing in a predetermined direction upon a round trip movement of said engaging means to perform a focus adjusting operation, said control means having a plurality of parts engageable with said engaging means;
(d) first signal generating means for producing a pulse-shaped electrical signal so as to repeat cyclic current supply to said coil, said first signal generating means controlling the current supply to said coil such that one pulse of the electrical signal allows for said engaging means to engage a next part of said control means;
(e) a photographic lens whose focusing position is adjusted by said control means;
(f) shutter means for performing an exposure operation, said shutter means being controlled by reciprocating motion of said coil;
(g) second signal generating means for supplying current to said coil for a time necessary for the exposure operation; and
(h) changeover means responsive to attainment of the aforesaid photographic lens of the in-focus position for rendering said first signal generating means inoperative and initiating an operation of said second signal forming means.

12. A camera including:
(a) engaging means;
(b) electromagnetic means responsive to a current supply for moving said engaging means from an initial position, and responsive to termination of the current supply for returning said engaging means to the initial position;
(c) control means for controlling a focus adjusting operation, said control means upon movement in a predetermined direction being arranged for performing a focus adjusting operation and upon engagement with said engaging means being to have movement of the control means controlled by said engaging means, and said control means having a plurality of parts engageable with said engaging means;
(d) first signal generating means for producing a pulse-shaped electrical signal so as to repeat cyclic current supplies to said electromagnetic means, said first signal generating means being arranged for controlling the current supply to said electromagnic means in such a manner that one pulse of the electrical signal allows said engaging means to engage a next part of said control means;

(e) a photographic lens whose focusing position is adjusted by said control means;

(f) shutter means for performing an exposure operation, said shutter means being controlled by reciprocating motion of said electromagnetic means;

(g) second signal generating means for supplying current to said electromagnetic means for a time necessary for the exposure operation; and (h) changeover means responsive to attainment of the aforesaid photographic lens of the in-focus position for rendering said first signal generating means inoperative and initiating an operation of said second signal generating means.

* * * * *